United States Patent
Nakayama

(10) Patent No.: US 9,819,821 B2
(45) Date of Patent: Nov. 14, 2017

(54) IMAGE FORMING DEVICE, NETWORK SYSTEM, AND POWER SUPPLY CONTROL PROGRAM

(71) Applicant: Konica Minolta, Inc., Tokyo (JP)

(72) Inventor: Yoshimi Nakayama, Hino (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/182,957

(22) Filed: Jun. 15, 2016

(65) Prior Publication Data
US 2017/0006177 A1 Jan. 5, 2017

(30) Foreign Application Priority Data

Jul. 1, 2015 (JP) .................. 2015-132567

(51) Int. Cl.
G06F 15/00 (2006.01)
H04N 1/00 (2006.01)
H04L 29/06 (2006.01)
H04L 29/08 (2006.01)

(52) U.S. Cl.
CPC ......... *H04N 1/00891* (2013.01); *H04L 69/22* (2013.01); *H04N 1/00244* (2013.01); *H04N 1/00896* (2013.01); *H04L 67/10* (2013.01); *H04N 2201/0094* (2013.01)

(58) Field of Classification Search
None
See application file for complete search history.

(56) References Cited

U.S. PATENT DOCUMENTS

2016/0337540 A1* 11/2016 Fujisawa ............ H04N 1/00891

FOREIGN PATENT DOCUMENTS

JP 2014-127868 A 7/2014

* cited by examiner

*Primary Examiner* — Helen Q Zong
(74) *Attorney, Agent, or Firm* — Baker Hostetler LLP

(57) ABSTRACT

An image forming device includes at least one image formation function of copying, scanning, and printing, and a server function enabling reading of data from a storage unit and writing of data into the storage unit, the image forming device being connected to at least one external device having a server function via a network and including a power supply control unit configured to control a plurality of power-saving modes having different settings for supplying power to hardware, to make power consumption smaller than power consumption in a normal mode for enabling the image formation function, wherein: the plurality of power-saving modes include a first power-saving mode, a second power-saving mode, and a third power-saving mode; and the power supply control unit includes: a packet analyzing unit; a determining unit; and a mode control unit.

18 Claims, 7 Drawing Sheets

FIG. 7

| | | CONTROLLER | | | | | | |
|---|---|---|---|---|---|---|---|---|
| | | MAIN CPU | SUB CPU | RAM | HDD | PANEL | SCANNER | ENGINE |
| POWER-SAVING MODE | 1 STANDBY MODE | | ○ | | | | | |
| | 2 MEDIATION MODE | ○ | | ○ | | | | |
| | 3 SERVER MODE | ○ | | ○ | ○ | | | |
| NORMAL MODE | | ○ | | ○ | ○ | ○ | ○ | ○ |

IMAGE FORMING DEVICE, NETWORK SYSTEM, AND POWER SUPPLY CONTROL PROGRAM

CROSS-REFERENCE TO RELATED APPLICATIONS

This application is entitled to and claims the benefit of Japanese Patent Application No. 2015-132567 filed on Jul. 1, 2015, the contents of which, including the description, claims, drawings, and abstract, are incorporated herein by reference in its entirety.

BACKGROUND OF THE INVENTION

Field of the Invention

The present invention relates to an image forming device, a network system, and a power supply control program, and more particularly, to an image forming device having a server function, a network system including the image forming device, and a power supply control program for controlling the state of the power supply to the hardware of the image forming device.

Description of the Related Art

MFPs (Multi-Functional Peripherals) having a printer function, a copy function, a scanner function, and the like are widely used these days. Such an MFP includes a necessary storage as a server, and also has a network connection function, a user authentication function, and the like. Having such structures, these MFPs can be made to function as servers, and the use of the MFPs can lower the initial costs of network system installation in small businesses and branch offices.

A system may also be constructed by connecting the MFPs that have server functions and are installed in offices (departments or branches) to a cloud server or the like that manages all the MFPs via a network. In such a system, a user can collectively check the data of the MFPs installed in his/her office and the data of the cloud server simply by accessing an MFP installed in his/her office. A user can also use cloud services. Furthermore, data can be easily separated into the data to be shared among all the users allowed to access the system, and the data to be used only by the user(s) authorized to access a particular MFP. Thus, data management becomes easier.

To shorten the standby time before a printed material is output, an MFP performs control so that the fixing unit for fixing a toner image formed on a paper sheet is maintained at a certain temperature, for example. As a result, the power consumption in the ready state becomes larger. In view of this, when a non-use state continues for a certain period of time, the image forming device is switched from the ready state to a sleep state in which less power is consumed. Thus, power consumption is reduced.

As for such sleep state control, JP 2014-127868 A discloses an image forming device that includes: hardware modules that can be subjected to power control independently of one another; a detecting unit that detects one or more pieces of application software customized by the user of the image forming device among pieces of application software to be executed in the image forming device; a determining unit that determines sleep states for the respective hardware modules in accordance with the type(s) of the one or more pieces of application software; and a power control unit that controls sleep operations of the hardware modules independently of one another, in accordance with results of the determination performed by the determining unit.

In a case where a printer function, a copy function, a scanner function, or the like of an MFP is to be used, it is necessary to supply power to all the hardware including the engine. When the server function of an MFP is to be used, however, only reading of data from a storage unit and writing of data into the storage unit have to be enabled, and there is no need to supply power to the hardware such as an engine.

In a conventional control operation, however, an MFP in a sleep state returns to a ready state from the sleep state upon receipt of a predetermined packet from a host device connected to the network, and then supplies power to all the hardware. That is, although the hardware for image processing is not necessary when the server function of an MFP is used, power is supplied to all the hardware in the same manner as in a case where a printer function, a copy function, a scanner function, or the like is used. As a result, the MFP cannot be efficiently operated.

To counter this problem, JP 2014-127868 A discloses a technology for performing power supply control on hardware modules separately from one another. In a case where sleep states are set according to this technology and only a server function is to be used, power is supplied only to the necessary hardware (storages such as the CPU and an HDD).

However, an MFP that has received a request for use of a server function is not capable of determining whether the request is a request for use of the server function of its own device, and whether the request is a request for use of a server function of an external device such as a cloud server. As a result, even in a case where such an MFP receives a request for use of a server function of an external device, the MFP supplies power to the unnecessary hardware (a storage such as an HDD), to make the server function of its own device available. Because of this, the MFP cannot be efficiently operated.

SUMMARY OF THE INVENTION

The present invention has been made in view of the above problems, and a main object thereof is to provide an image forming device, a network system, and a power supply control program that can appropriately supply power to the respective pieces of hardware in the device when the device returns from a sleep state, and can efficiently operate the device.

To achieve the abovementioned object, according to an aspect, an image forming device reflecting one aspect of the present invention comprises at least one image formation function of copying, scanning, and printing, and a server function enabling reading of data from a storage unit and writing of data into the storage unit, the image forming device being connected to at least one external device having a server function via a network and including a power supply control unit configured to control a plurality of power-saving modes having different settings for supplying power to hardware, to make power consumption smaller than power consumption in a normal mode for enabling the image formation function, wherein: the plurality of power-saving modes include a first power-saving mode for enabling a network connection function, a second power-saving mode for enabling a mediation function for mediating processing for the external device, and a third power-saving mode for enabling the server function; and the power supply control unit includes: a packet analyzing unit configured to analyze a packet received from the network when a power supply state is the first power-saving mode; a determining unit configured to determine whether an instruction contained in the packet is a request for use of the image formation function, whether the instruction contained in the packet is a request for use the server function, and whether the instruction contained in the packet is a request for use of a service being provided by the external device, in accordance with a result of the analysis of the packet; and a mode control unit configured to switch the power supply state from the first power-saving mode to the normal mode when the instruction contained in the packet is a request for use of the image formation function, and switch the power supply state from the first power-saving mode to the second power-saving mode when the instruction contained in the packet is a request for use of a service being provided by the external device.

To achieve the abovementioned object, according to an aspect, a network system reflecting one aspect of the present invention comprises: an image forming device having at least one image formation function of copying, scanning, and printing, and a server function enabling reading of data from a storage unit and writing of data into the storage unit; at least one external device having a server function; and a host device, the image forming device, the external device, and the host device being connected via a network, wherein: the image forming device including a power supply control unit configured to control a plurality of power-saving modes having different settings for supplying power to hardware, to make power consumption smaller than power consumption in a normal mode for enabling the image formation function; the plurality of power-saving modes include a first power-saving mode for enabling a network connection function, a second power-saving mode for enabling a mediation function for mediating processing for the external device, and a third power-saving mode for enabling the server function; and the power supply control unit of the image forming device analyzes a packet received from the host device when a power supply state is the first power-saving mode, in accordance with a result of the analysis of the packet, determines whether an instruction contained in the packet is a request for use of the image formation function, whether the instruction contained in the packet is a request for use the server function, and whether the instruction contained in the packet is a request for use of a service being provided by the external device, and switches the power supply state from the first power-saving mode to the normal mode when the instruction contained in the packet is a request for use of the image formation function, and switches the power supply state from the first power-saving mode to the second power-saving mode when the instruction contained in the packet is a request for use of a service being provided by the external device.

To achieve the abovementioned object, according to an aspect, there is provided a non-transitory recording medium storing a computer readable power supply control program to be executed in an image forming device having at least one image formation function of copying, scanning, and printing, and a server function enabling reading of data from a storage unit and writing of data into the storage unit, the image forming device being connected to at least one external device having a server function via a network, the image forming device including a power supply control unit configured to control a plurality of power-saving modes having different settings for supplying power to hardware, to make power consumption smaller than power consumption in a normal mode for enabling the image formation function, the plurality of power-saving modes including a first power-saving mode for enabling a network connection function, a second power-saving mode for enabling a mediation function for mediating processing for the external device, and a third power-saving mode for enabling the server function, the power supply control program reflecting one aspect of the present invention causes the power supply control unit to perform: a first process of switching a power supply state from the normal mode to the first power-saving mode; a second process of analyzing a packet received from the network; a third process of determining whether an instruction contained in the packet is a request for use of the image formation function, whether the instruction contained in the packet is a request for use the server function, and whether the instruction contained in the packet is a request for use of a service being provided by the external device, in accordance with a result of the analysis of the packet; and a fourth process of switching the power supply state from the first power-saving mode to the normal mode when the instruction contained in the packet is a request for use of the image formation function, and switching the power supply state from the first power-saving mode to the second power-saving mode when the instruction contained in the packet is a request for use of a service being provided by the external device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7 is a table showing the relationship between modes of an image forming device according to an embodiment of the present invention and the hardware that supplies power;

DESCRIPTION OF THE PREFERRED EMBODIMENTS

Figure 1:
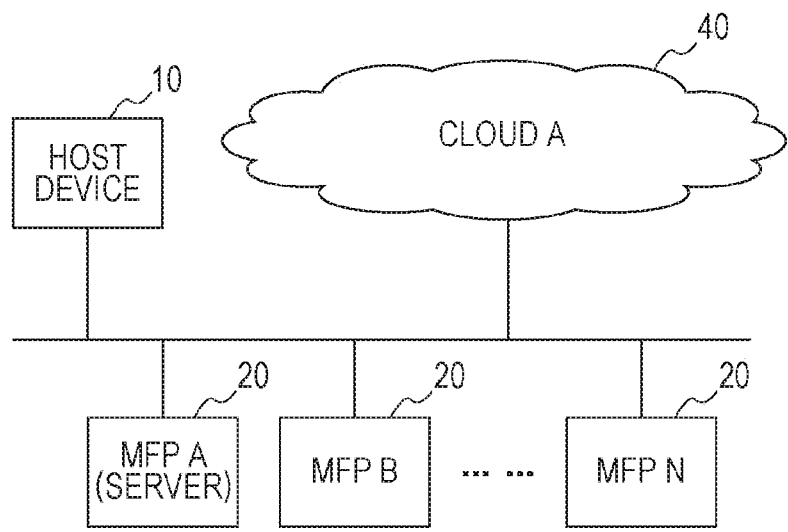
FIG. 1 is a diagram schematically showing an example of a network system according to an embodiment of the present invention.

Hereinafter, an embodiment of the present invention will be described with reference to the drawings. However, the scope of the invention is not limited to the illustrated examples.

As described in the Description of the Related Art, when a non-use state continues for a certain period of time in an MFP, the MFP is switched from a ready state to a sleep state, and is returned to a ready state upon receipt of a predetermined packet. In a conventional return control operation, even when the server function of an MFP is to be used, power is supplied to all the hardware as in a case where a printer function, a copy function, a scanner function, or the like is used. As a result, the MFP cannot be efficiently operated.

To counter this problem, a sleep state in which power is supplied only to the minimum hardware may be set when only a server function is executed. However, an MFP that has received a request for use of a server function is not capable of determining whether the request is a request for use of the server function of its own device, and whether the request is a request for use of a server function of an external device such as a cloud server. As a result, the power supply is controlled to enable the server function of its own device even when a request for use of a server function of an external device is received. Because of this, the MFP cannot be efficiently operated.

In view of this, an embodiment of the present invention provides a network system that can enable not only the functions in its own device but also the functions of services being provided by an external device such as a cloud server via its own device. In this network system, power-saving modes for setting power supplies to the hardware in a sleep mode are as follows: a standby mode (a first power-saving mode) for supplying power only to the hardware necessary for monitoring the network; a mediation mode (a second power-saving mode) for supplying power only to the hardware necessary for mediating services; and a server mode (a third power-saving mode) for supplying power only to the hardware necessary for causing its own device to function as a server.

When a packet is received from a host device while the power supply state is the standby mode, the received packet is analyzed, and, in accordance with a result of the analysis, a check is made to determine whether the instruction contained in the packet is a request for use of an image formation function such as copying, scanning, or printing, whether the instruction in the packet is a request for use of a server function, and whether the instruction in the packet is a request for use of a service being provided by an external device. If the instruction is a request for use of an image formation function, the power supply state is switched from the standby mode to a normal mode. If the instruction is a request for use of a service being provided by an external device, the power supply state is switched from the standby mode to the mediation mode. If the instruction contained in the packet is a request for use of a server function, a check is made to determine whether the request is a request for use of the server function of its own device and whether the request is a request for use of a server function of an external device. If the request is a request for use of the server function of its own device, the power supply state is switched from the standby mode to the server mode. If the request is a request for use of a server function of an external device, the power supply state is switched from the standby mode to the mediation mode. In this manner, power supplies to unnecessary hardware are prevented.

As the three different power-saving modes are set for the hardware to be supplied with power, unnecessary hardware is not operated when a request for use of a function or a service of an external device is received. Thus, an MFP can be efficiently operated.

EXAMPLE

Figure 2:
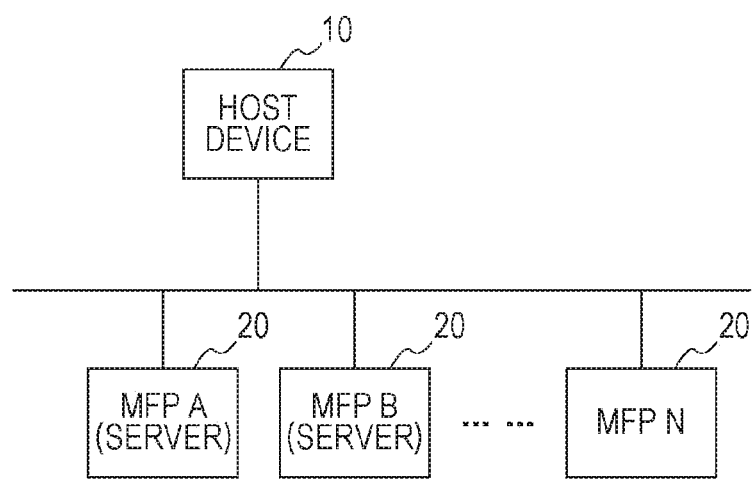
FIG. 2 is a diagram schematically showing another example of a network system according to an embodiment of the present invention.
Figure 4A:
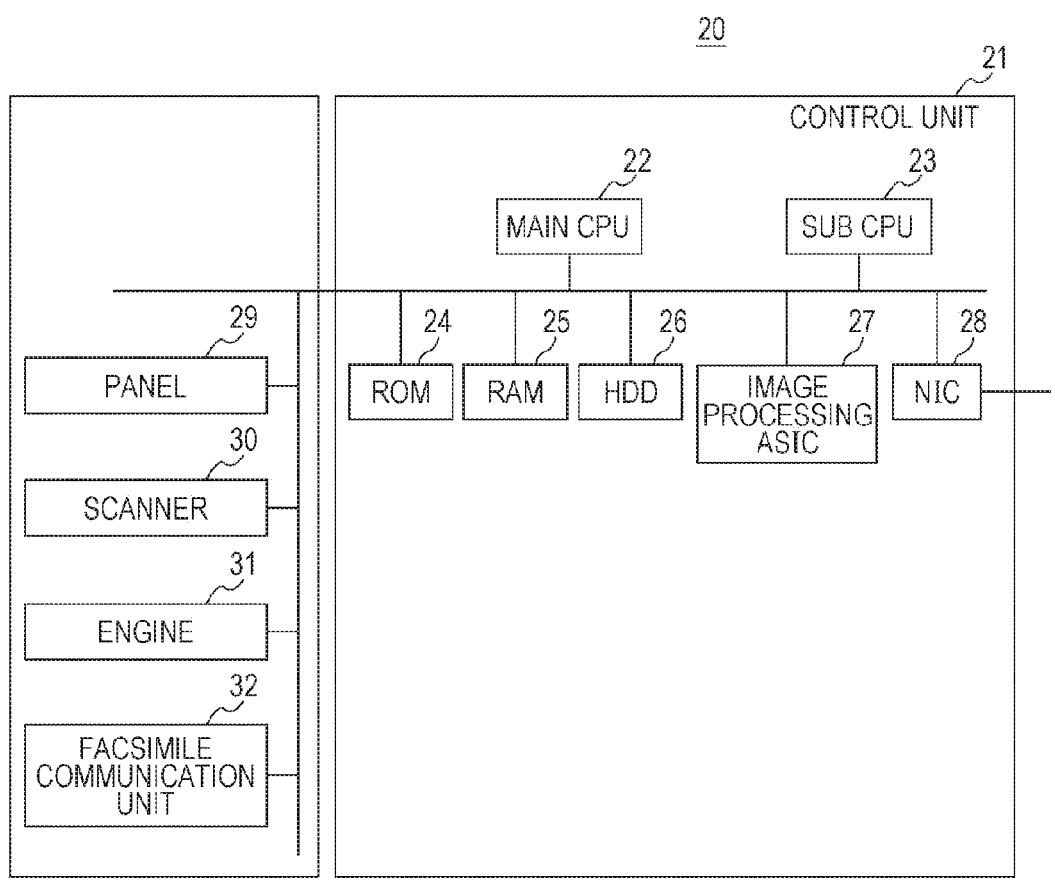
FIG. 4A is a block diagram showing the structure of an image forming device according to an embodiment of the present invention.
Figure 4B:
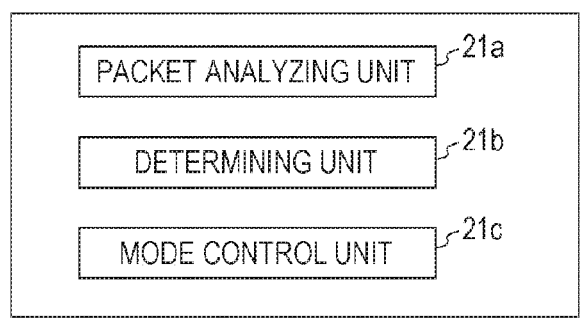
FIG. 4B is a block diagram showing the structure of an image forming device according to an embodiment of the present invention.
Figure 5:
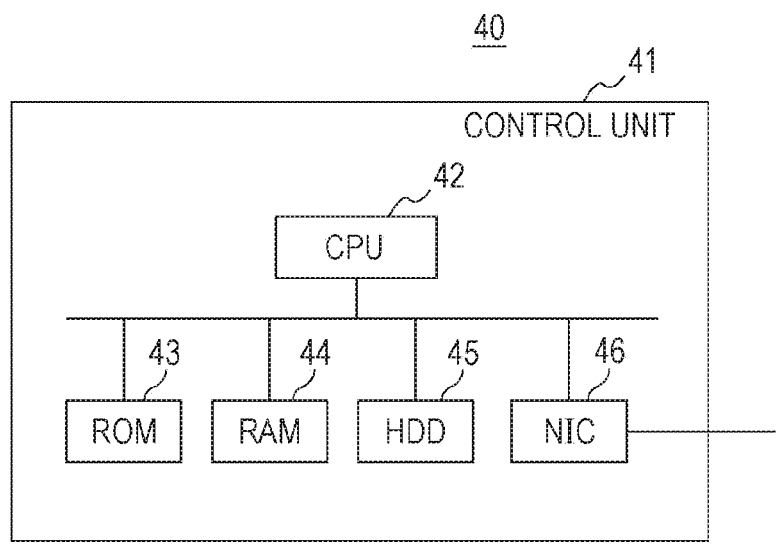
FIG. 5 is a block diagram showing the structure of a server device according to an embodiment of the present invention.
Figure 6:
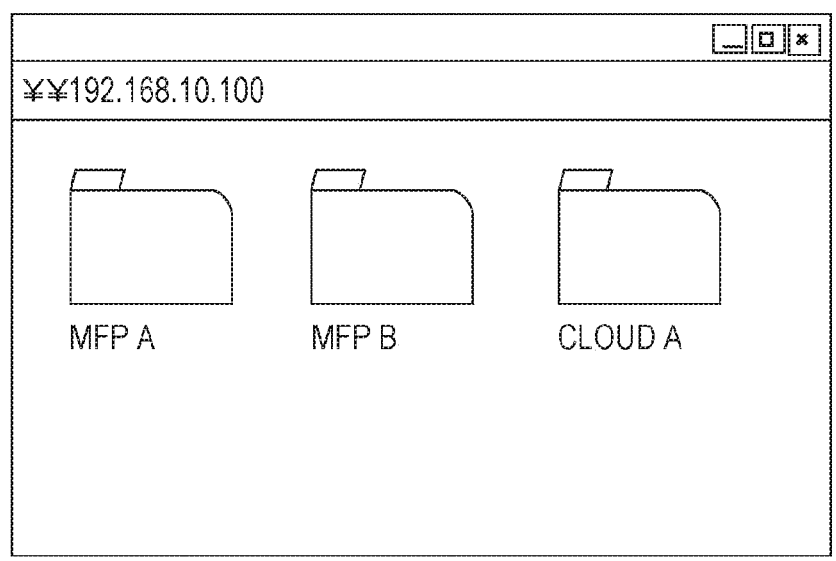
FIG. 6 is a diagram showing an example of a screen displayed on a host device according to an embodiment of the present invention.
Figure 8:
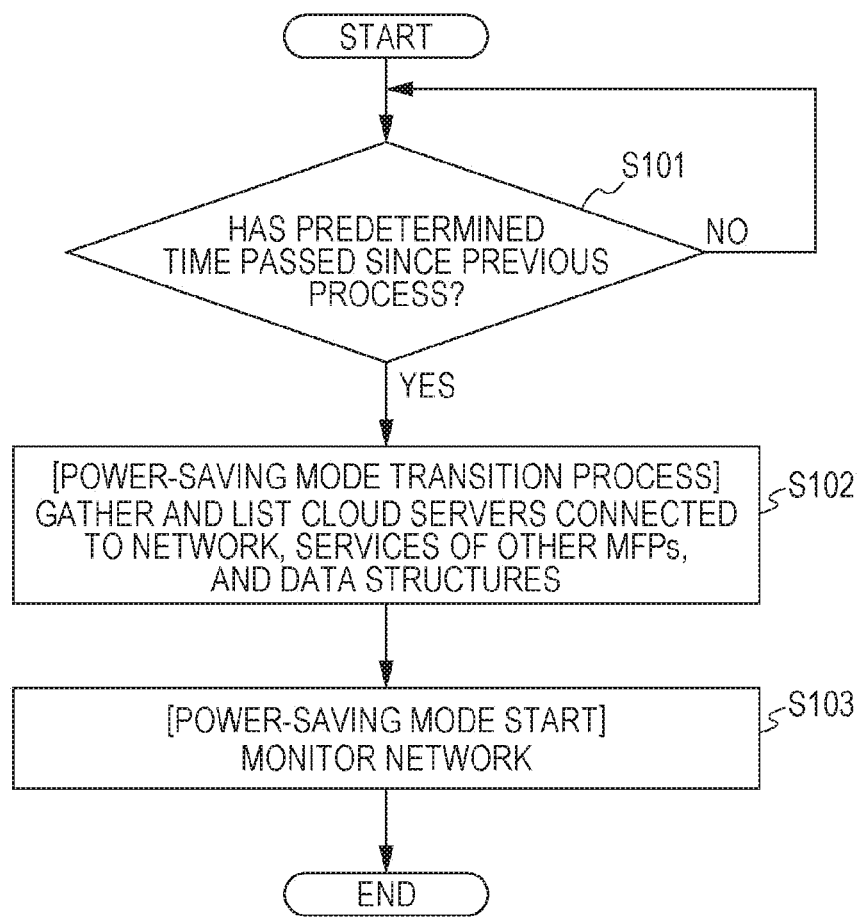
FIG. 8 is a flowchart showing an operation (a process of transition to a standby mode) of an image forming device according to an embodiment of the present invention.
Figure 9:
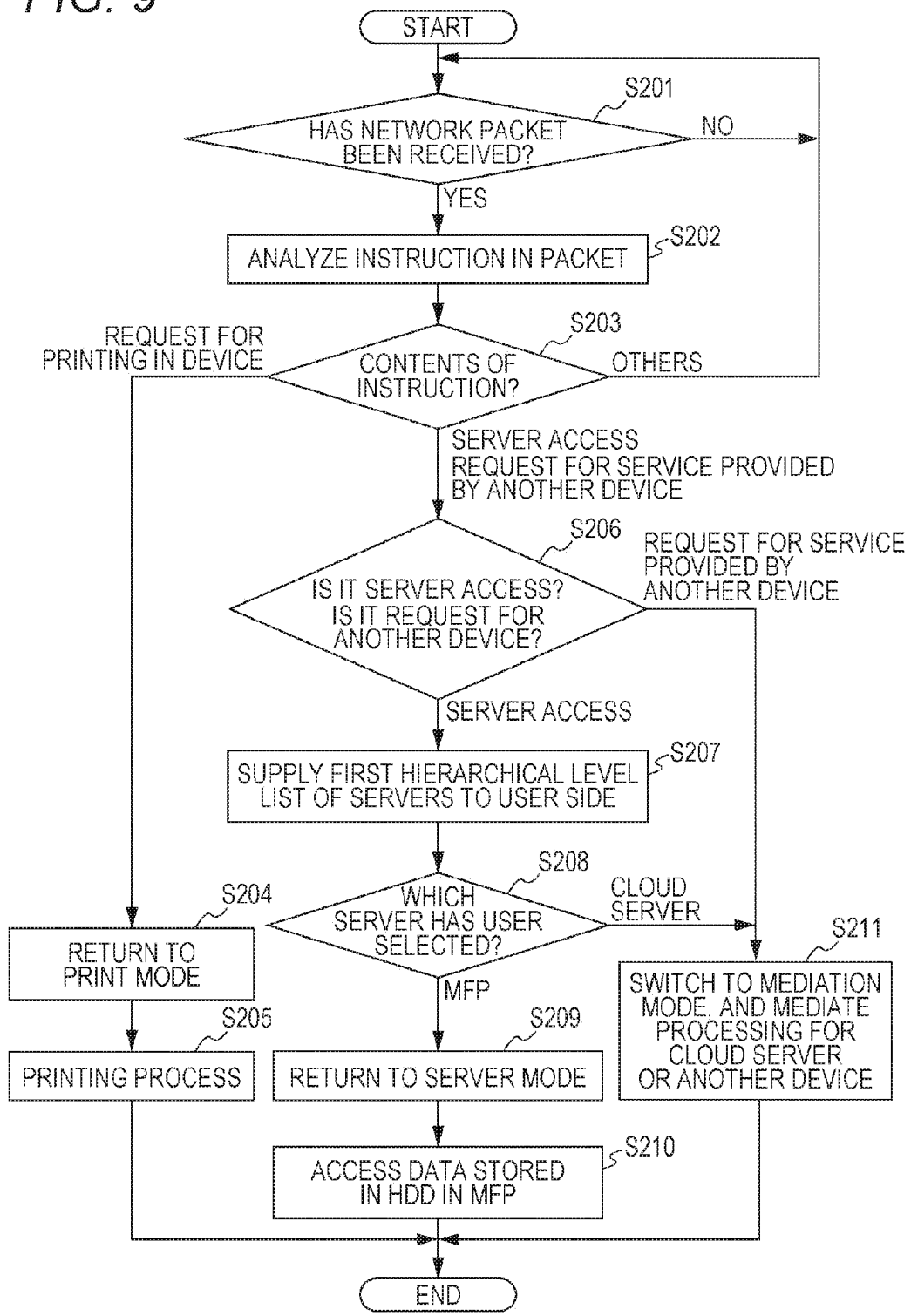
FIG. 9 is a flowchart showing an operation (a process of return from a standby mode) of an image forming device according to an embodiment of the present invention.

To explain the above described embodiment of the present invention in greater detail, an image forming device, a network system, and a power supply control program according to an example of the present invention are described, with reference to FIGS. 1 through 9. FIGS. 1 and 2 are diagrams schematically showing network systems of this example. FIGS. 3A through 5 are block diagrams showing the structures of a host device, an image forming device, and a server device, respectively. FIG. 6 is a diagram showing an example of a screen displayed on the host device of this example. FIG. 7 is a table showing the relationship between modes of the image forming device and the hardware that supplies power. FIGS. 8 and 9 are flowcharts showing operations of the image forming device of this example.

As shown in FIG. 1, a network system of this example includes a host device 10 that uses services provided by the network system, at least one image forming device (MFP) 20 that has a server function, and a server device 40 such as a cloud server. These components are connected to one another via a network such as a LAN (Local Area Network) or a WAN (Wide Area Network) specified in standards of the Ethernet (a registered trade name), the Token Ring, FDDI (Fiber-Distributed Data Interface), or the like. In this example, the network system includes the server device 40. However, in a case where two or more image forming devices 20 (an MFP A and an MFP B in this case) each having a server function are connected to the network, as shown in FIG. 2, the server device 40 may not be provided. In the description below, explanation will be made on the assumption that the network system has the structure shown in FIG. 1.

[Host Device]

Figure 3A:
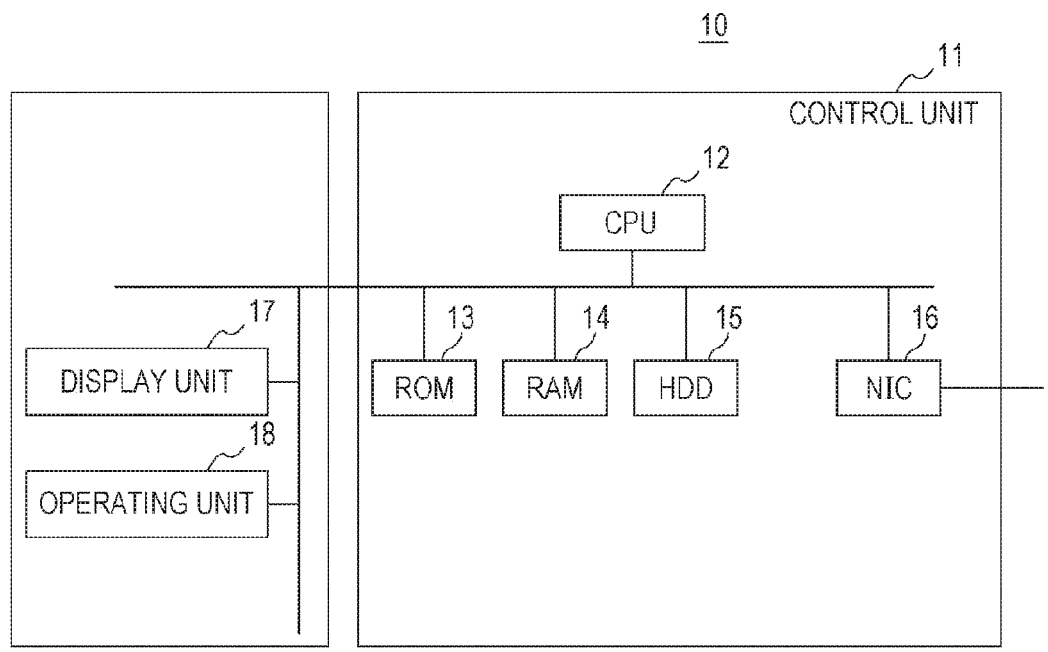
FIG. 3A is a block diagram showing the structure of a host device according to an embodiment of the present invention.
Figure 3B:
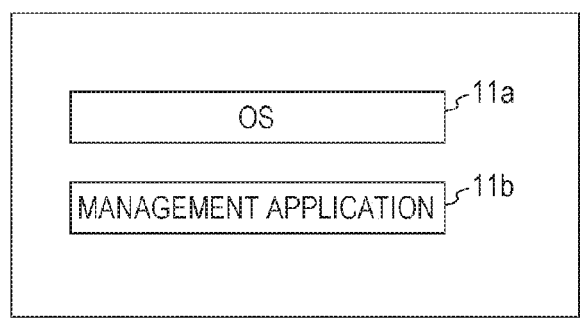
FIG. 3B is a block diagram showing the structure of a host device according to an embodiment of the present invention.

The host device 10 is a computer device, a tablet terminal, a smartphone, or the like, and, as shown in FIG. 3A, includes a controller (a control unit) 11, a display unit 17, and an operating unit 18.

The control unit 11 includes a CPU (Central Processing Unit) 12, memories such as a ROM (Read Only Memory) 13 and a RAM (Random Access Memory) 14, a storage unit such as an HDD (Hard Disk Drive) 15, and a network interface unit such as an NIC (Network Interface Card) 16. The CPU 12 reads a program for controlling operation of the host device 10, an OS (Operating System) 11a or a management application 11b shown in FIG. 3B, or the like from the ROM 13 or the HDD 15, loads it into the RAM 14, and then executes it.

The management application 11b designates the MAC (Media Access Control) address, the IP (Internet Protocol) address on the network, or the port number of an image forming device 20 or the server device 40, and transmits a packet in which an instruction for a desired image forming device 20 or the server device 40 to use a desired service is written. The management application 11b also acquires, from the image forming device 20 to which the packet has been transmitted, the list showing the locations of the storage areas (folders) available as servers on the network (the list at the hierarchical level showing the storage areas of the respective devices (this level is called the first hierarchical level)). In accordance with the acquired list, the management application 11b causes the display unit 17 to display the server select screen for the user to select a server, and notifies the image forming device 20 of a result of the selection.

FIG. 6 shows an example of the server select screen 50 on which the folders of the image forming devices 20 with server functions connected to the network and the server device 40 connected to the network are displayed. As this server select screen 50 is displayed, a user simply has to access an image forming device 20 having a server function, to use data stored in another image forming device 20 having a server function or in the server device 40 such as a cloud server. For example, by accessing the server (192.168.10.100) of the MFP A, a user can also check the data stored in the MFP B connected to the network and the data stored in a cloud server A connected to the network. Also, user authentication is performed when a folder is selected on this server select screen 50, so that the security in data management can be increased. In this example, a service using data stored in the cloud server is described as an example of a service to be provided by the cloud server. In a system where each image forming device 20 only has a scanner and an engine, however, a cloud server may also perform image processing. As such a cloud service is provided, each image forming device 20 can be provided at a lower price, and costs of equipment investments can be lowered for small business corporations and branch offices.

The display unit 17 is formed with a liquid crystal display (LCD) or the like, and displays the management screen of the management application 11b, the above described server select screen 50, or the like. The operating unit 18 is formed with a mouse, a keyboard, and the like, and enables operations such as service selection on the management screen and server selection on the server select screen 50.

[Image Forming Device]

Each of the image forming devices 20 (at least one image forming device 20 having a server function, and other image forming devices 20) includes a controller (a control unit) 21, a panel (an operation display unit) 29, a scanner (an image reading unit) 30, an engine (an image forming unit) 31, and a facsimile communication unit 32, as shown in FIG. 4A. The image forming devices 20 have MAC addresses unique to the respective devices, and IP addresses or port numbers, such as "192.168.10.100", "192.168.10.101", . . . , are assigned beforehand to the image forming devices 20. The image forming devices 20 included in the network system can be managed as a group, and the image forming devices 20 belonging to the same group can be controlled in this example.

The control unit 21 includes a multi-core CPU formed with a main CPU 22 and a sub CPU 23, memories such as a ROM 24 and a RAM 25, a storage unit such as an HDD 26, an image processing unit such as an image processing ASIC (Application Specific Integrated Circuit) 27, and a communication interface unit such as an NIC 28. The control unit 21 receives a user instruction (operation information from the panel 29 or a packet from the host device 10) from the panel 29 or the network), and performs predetermined control on the HDD 26, the image processing ASIC 27, the scanner 30, the engine 31, the facsimile communication unit 32, or the like. Particularly, an image forming device 20 having a server function serves as a server having a predetermined storage area in the HDD 26 to be accessed via the network, and the control unit 21 controls reading of data from the HDD 26 and writing of data into the HDD 26.

The sub CPU 23 functions as a power supply control unit that controls power-saving modes for supplying power to the hardware in the respective functions. As shown in FIG. 4B, the power supply control unit functions as a packet analyzing unit 21a, a determining unit 21b, a mode control unit 21c, and the like.

The packet analyzing unit 21a analyzes a packet received from the host device 10. Specifically, the packet analyzing unit 21a extracts device designation information such as a MAC address, an IP address, or a port number, and service designation information such as an instruction for the use of a service.

In accordance with the MAC address, the IP address, or the port number, and the instruction or the like extracted from the packet, the determining unit 21b determines whether the request from the host device 10 is a request for use of a copy, scan, or print function (referred to as an image formation function) of its own device, whether the request from the host device 10 is a request for use of the server function of its own device or an external device such as a cloud server, and whether the request from the host device 10 is a request for use of a service being provided by an external device. If the request from the host device 10 is a request for use of a server function, the determining unit 21b transmits a first hierarchical level list generated by the mode control unit 21c to the host device 10, which has transmitted the packet. The determining unit 21b then receives a result of server selection from the host device 10. In accordance with the result of the selection, the determining unit 21b determines whether the request is a request for use of the server function of its own device, and whether the request is a request for use of a server function of an external device such as a cloud server.

The mode control unit 21c sets a mode of the image forming device 20, and changes modes in accordance with a result of determination made by the determining unit 21b. In this manner, the mode control unit 21c controls the power supply states of respective pieces of hardware. Specifically, as shown in the table in FIG. 7, an image forming device 20 of this example has normal modes (such as a print mode, a scan mode, and a facsimile mode) in which the respective functions of the image forming device 20 are in a ready state and can be instantly executed, and power-saving modes in which the respective functions are in a sleep state to consume less power than in the ready state. The power-saving modes are power-saving modes (a standby mode, a mediation mode, and a server mode) for supplying power to different pieces of hardware.

The standby mode (a first power-saving mode) is a power supply mode that enables a network connection function and the functions to be executed by the power supply control unit. In the standby mode, power is supplied to the hardware (a communication interface unit such as the NIC 28) necessary for performing a network connection process, and to the hardware (the sub CPU 23, for example) necessary for power supply control. The mediation mode (a second power-saving mode) is a power supply mode that enables a mediation function to mediate an instruction for the server device 40 such as a cloud server and another image forming device 20. In the mediation mode, power is applied to the hardware (the main CPU 22 and the RAM 25, for example) necessary for performing a mediation process (a process of analyzing a packet and transferring the packet to a designated destination, for example). The server mode (a third power-saving mode) is a power supply mode that enables a server function to control reading of data from the HDD 26 and writing of data into the HDD 26 of its own device. In the server mode, power is supplied to the hardware (the main CPU 22, the RAM 25, and the HDD 26, for example) necessary for a server process. The normal modes are the power supply modes that enable the image formation functions such as copying, scanning, and printing. In the normal modes, power is supplied to the hardware (the main CPU 22, the RAM 25, the HDD 26, the image processing ASIC 27, the panel 29, the scanner 30, and the engine 31, for example) necessary for performing image processing.

In a case where a process is performed in a normal mode, and after that, any instruction is not issued for another process within a time preset by the user, the mode control unit 21c switches the power supply state from the normal mode to the standby mode, acquires information about another image forming device 20 or the server device 40 such as a cloud server, generates a first hierarchical level list indicating the locations of storage areas (folders) that can be used as servers on the network, and stores the first hierarchical level list into the HDD 26 or the like. In the standby mode, a packet received from the network is analyzed. If the instruction in the packet is a request for use of an image formation function, the power supply state is switched from the standby mode to a normal mode. If the instruction in the packet is a request for use of a service being provided by the server device 40 or another image forming device 20, the power supply state is switched from the standby mode to the mediation mode. If the instruction in the packet is a request for use of the server function of its own device, the power supply state is switched from the standby mode to the server mode. If the instruction in the packet is a request for use of a server function of the server device 40 or another image forming device 20, the power supply state is switched from the standby mode to the mediation mode.

The power supply control unit (the packet analyzing unit 21a, the determining unit 21b, and the mode control unit 21c) may be formed as hardware. Alternatively, the power supply control unit may be formed as a power supply control program for causing the control unit 21 to function as the power supply control unit (the packet analyzing unit 21a, the determining unit 21b, and the mode control unit 21c), and the power supply control program may be executed by the sub CPU 23. In this example, the sub CPU 23 is designed to execute the power supply control program. However, the clock frequency of the main CPU 22 may be lowered to execute the power supply control program, or the power supply control program may be executed with part of the multi-core CPU. In this example, the operation to be performed by the power supply control unit when the power supply state is the standby mode is described. However, when the power supply state is some other mode, the power supply control unit can be made to operate in the same manner.

In this example, when a request for use of a server function of an external device such as a cloud server is received, the power supply state is switched to the mediation mode. However, if a mediation process can be performed in the standby mode, it is not necessary to switch the power supply state to the mediation mode. In this example, the power-saving modes are the three modes: the standby mode, the mediation mode, and the server mode in this example. However, there may be four or more modes in which power is to be supplied to different pieces of hardware.

In a case where the instruction included in a packet is a print instruction, and print data is received immediately after the packet, the image processing ASIC 27 analyzes the print data, and generates image data of each page by rasterizing each page in the print data. Alternatively, the image processing ASIC 27 acquires image data from the scanner 30, performs image processing (such as color adjustment, density adjustment, and size adjustment) and screening as necessary, and then converts the processed image data into image data that can be printed by the engine 31.

The panel (operation display unit) 29 is formed with a touch panel or the like that has a pressure-sensitive operating unit including transparent electrodes arranged in a grid-like pattern on a display unit such as a liquid crystal display. The panel 29 displays the screen for operating the image forming device 20, the screen for setting print conditions, or the like, and enables various settings and issuance of instructions.

The scanner (the image reading unit) 30 is a component that optically reads image data from an original document placed on a platen. The scanner 30 includes a light source that scans the original document, image sensors such as CCDs (Charge Coupled Devices) that convert light reflected from the original document into electrical signals, and an A/D converter that performs A/D conversion on the electrical signals.

The engine (the image forming unit) 31 includes components necessary for image formation using an image forming process such as an electrophotographic process or an electrostatic recording process. The engine 31 prints an image based on image data generated from print data or image data read in by the scanner 30, onto a designated paper sheet. Specifically, a photosensitive drum charged by a charging device is irradiated with light from an exposure device in accordance with the image, so that an electrostatic latent image is formed. The electrostatic latent image is developed by a development device applying charged toner thereto. The toner image is transferred onto a transfer belt by primary transfer, is transferred onto a paper sheet by secondary transfer, and is fixed on the paper sheet by a fixing device.

The facsimile communication unit 32 detects a call signal or the like when a normal call is received. The facsimile communication unit 32 transmits a primary response signal in response to the detected call signal. The facsimile communication unit 32 then performs processing in the five phases: Phase A (call connection establishment), Phase B (capacity exchange/training), Phase C (image data transmission/reception), Phase D (image data transmission/reception confirmation), and Phase E (disconnection).

[Server Device]

The server device 40 is a computer device or the like. As shown in FIG. 5, the server device 40 includes a controller (a control unit 41), and, if necessary, a display unit (not shown) and an operating unit (not shown). The control unit 41 includes a CPU 42, memories such as a ROM 43 and a RAM 44, a storage unit such as an HDD 45, and a network interface unit such as an NIC 46. A predetermined storage area in the HDD 45 serves as a server that can be accessed via the network, and the control unit 41 controls reading of data from the HDD 45 and writing of data into the HDD 45. In a case where the server device 40 provides another service, the server device 40 also has the function (such as an image processing ASIC) to provide the service, and the control unit 41 provides the service (by acing as an image processor, for example). The server device 40 also sets image forming devices 20 as a group of image forming devices in advance, and manages the image forming devices 20.

FIGS. 1 through 5 show an example of a network system according to an embodiment of the present invention, and the structure thereof can be changed as appropriate. For example, in FIG. 4, an image forming device 20 of this example includes the scanner 30, the engine 31, and the facsimile communication unit 32. However, an image forming device 20 may function as a single-function printer without the scanner 30 and the facsimile communication unit 32, or may function as a scanner device or a facsimile device without the engine 31. In a case where two or more image forming devices 20 each having a server function are connected to the network system, as shown in FIG. 2, the server device 40 may not be provided.

Operation of an image forming device 20 in the above described network system is now described. By executing the power supply control program, the sub CPU 23 carries out the procedures in the respective steps shown in the flowcharts in FIGS. 8 and 9. FIG. 8 shows a process of transition to the standby mode. FIG. 9 shows a process of return from the standby mode.

[Process of Transition to Standby Mode]

As shown in FIG. 8, the power supply control unit (the mode control unit 21c) determines whether a time preset by the user has passed since the previous processing in a normal mode (S101). If any instruction is not issued for another process within the predetermined time, the power supply control unit (the mode control unit 21c) performs a power-saving mode transition process by gathering and listing information about the other image forming devices 20 and the server device 40 such as a cloud server at this point of time (the information indicating the services being provided by these devices, the data structures of the storage units functioning as servers, and the like) (S102). In a case where the image forming devices 20 and the server device 40 are compatible with SNMP (Simple Network Management Protocol), the information can be acquired from an MIB (Management Information Base).

After that, the power supply control unit (the mode control unit 21c) switches the power supply state from the normal mode to a power-saving mode (the standby mode), and monitors the network (S103). In doing so, the power supply control unit suspends the power supply to the main CPU 22 and activates the sub CPU 23, or lowers the clock frequency of the main CPU 22.

[Process of Return from Standby Mode]

As shown in FIG. 9, the power supply control unit (the packet analyzing unit 21a) monitors packets from the network (the host device 10) (S201). After receiving a packet from the network in a power-saving mode (the standby mode), the power supply control unit (the packet analyzing unit 21a) analyzes the received packet (S202). As described above, this packet contains device designation information such as a MAC address, an IP address, or a port number, and service designation information such as an instruction for the use of a service.

In accordance with a result of the packet analysis, the power supply control unit (the determining unit 21b) determines the contents of the instruction designated by the packet (S203). If the instruction in the received packet are a request for use of an image formation function of its own device (a print instruction, for example), the power supply control unit (the mode control unit 21c) returns the power supply state to a normal mode (the print mode) (S204), and activates the engine 31 to perform a printing process (S205). If the instruction is not a print instruction but a scan instruction or a facsimile instruction, the power supply state is also returned to a normal mode (the scan mode or the facsimile mode). If the instruction in the packet indicates regular access (a Ping packet, for example) unrelated to any return, the power supply control unit performs no processing, and returns to S201 to monitor packets from the network.

If the instruction in the received packet is not for regular access but is a print instruction, a scan instruction, or a facsimile instruction, the power supply control unit (the determining unit 21b) determines whether the instruction is for server access (a request for use of a server function), and whether the instruction is a request for use of a service being provided by another device, in accordance with a result of the packet analysis (S206). If the instruction in the packet is for server access, the power supply control unit (the determining unit 21b) provides the user's host device 10 with the first hierarchical level list stored in the HDD 26 or the like (S207). After that, the power supply control unit (the determining unit 21b) receives a result of server selection from the host device 10, and determines the server selected by the user (S208). If the server selected by the user is its own device, the power supply control unit (the mode control unit 21c) supplies power to the main CPU 22, the RAM 25, and the HDD 26, to return the power supply state to the server mode (S209), and then accesses data stored in the HDD 26 of its own device (S210).

If the instruction in the packet is determined to be a request for use of a service being provided by another device in S206, or if the server selected by the user is determined to be a cloud server (or another image forming device 20 having a server function) in S208, the power supply control unit (the mode control unit 21c) switches the power supply state to the mediation mode, and mediates the process to be performed on the cloud server or another image forming device 20 (S211).

As described above, if a packet is received in a power-saving mode (the standby mode), the packet is analyzed, and a check is made to determine whether the instruction contained in the packet is a request for use of an image formation function such as copying, scanning, or printing, whether the instruction is a request for use of a server function, and whether the instruction is a request for use of a service being provided by an external device. If the instruction is a request for use of an image formation function, the power supply state is switched from the standby mode to a normal mode. If the instruction is a request for use of a service being provided by an external device, the power supply state is switched from the standby mode to the mediation mode. If the instruction in the packet is a request for use of a server function, a check is made to determine whether the request is for use of the server function of its own device and whether the request is for use of a server function of an external device. If the request is for use of the server function of its own device, the power supply state is switched from the standby mode to the server mode. If the request is for use of a server function of an external device, the power supply state is switched from the standby mode to the mediation mode. Thus, power can be supplied only to the necessary hardware, and each image forming device 20 can be efficiently operated.

The present invention is not limited to the above described example, and any appropriate modifications can be made to the configuration and the control, without departing from the scope of the present invention.

The present invention can be applied to an image forming device having a server function, a network system including the image forming device, a power supply control program for controlling the state of the power supply to the hardware of the image forming device, and a recording medium storing the power supply control program.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming device having at least one image formation function of copying, scanning, and printing, and a server function enabling reading of data from a storage unit and writing of data into the storage unit, the image forming device being connected to at least one external device having a server function via a network, the image forming device comprising:
    a power supply control unit controlling a plurality of power-saving modes having different settings for supplying power to hardware, to make power consumption smaller than power consumption in a normal mode for enabling the image formation function, wherein:
        the plurality of power-saving modes include a first power-saving mode for enabling a network connection function, a second power-saving mode for enabling a mediation function for mediating processing for the external device, and a third power-saving mode for enabling the server function; and
    the power supply control unit includes:
        a packet analyzing unit analyzing a packet received from the network when a power supply state is the first power-saving mode;
        a determining unit determining whether an instruction contained in the packet is a request for use of the image formation function, whether the instruction contained in the packet is a request for use the server function, and whether the instruction contained in the packet is a request for use of a service being provided by the external device, in accordance with a result of the analysis of the packet; and
        a mode control unit switching the power supply state from the first power-saving mode to the normal mode when the instruction contained in the packet is a request for use of the image formation function, and switch the power supply state from the first power-saving mode to the second power-saving mode when the instruction contained in the packet is a request for use of the service being provided by the external device.

2. The image forming device according to claim 1, wherein:
    when the instruction contained in the packet is a request for use of the server function, the determining unit determines whether the request is a request for use of the server function of the image forming device and whether the request is a request for use of the server function of the external device;
    when the request is a request for use of the server function of the image forming device, the mode control unit switches the power supply state from the first power-saving mode to the third power-saving mode; and
    when the request is a request for use of the server function of the external device, the mode control unit switches the power supply state from the first power-saving mode to the second power-saving mode.

3. The image forming device according to claim 2, wherein:
    when switching the power supply state from the normal mode to the first power-saving mode, the mode control unit creates and stores a list of devices having the server function; and
    when the instruction contained in the packet is a request for use of the server function, the determining unit supplies the list to the transmitter of the packet and causes the transmitter to select a device to use the server function, and, in accordance with a result of the selection, determines whether the request is a request for use of the server function of the image forming device and whether the request is a request for use of the server function of the external device.

4. The image forming device according to claim 1, wherein, when the instruction contained in the packet is none of (i) a request for use of the image formation function, (ii) a request for use of the server function, or (iii) a request for use of the service being provided by the external device, the mode control unit maintains the first power-saving mode as the power supply state.

5. The image forming device according to claim 1, further comprising a multi-core CPU, wherein the power supply control is performed with a core of the multi-core CPU or by lowering clock frequency of the multi-core CPU.

6. The image forming device according to claim 1, wherein the external device is one of a cloud server or another image forming device having a server function.

7. A network system comprising:
    an image forming device having at least one image formation function of copying, scanning, and printing, and a server function enabling reading of data from a storage unit and writing of data into the storage unit;
    at least one external device having a server function; and
    a host device;
    wherein the image forming device, the external device, and the host device are connected via a network;
    further wherein the image forming device includes:
        a power supply control unit controlling a plurality of power-saving modes having different settings for supplying power to hardware, to make power consumption smaller than power consumption in a normal mode for enabling the image formation function;
        wherein the plurality of power-saving modes include a first power-saving mode for enabling a network connection function, a second power-saving mode for enabling a mediation function for mediating processing for the external device, and a third power-saving mode for enabling the server function; and
        the power supply control unit of the image forming device analyzes a packet received from the host device when a power supply state is the first power-saving mode, in accordance with a result of the analysis of the packet, determines whether an instruction contained in the packet is a request for use of the image formation function, whether the instruction contained in the packet is a request for use the server function, and whether the instruction contained in the packet is a request for use of a service being provided by the external device, and switches the power supply state from the first power-saving mode to the normal mode when the instruction contained in the packet is a request for use of the image formation function, and switches the power supply state from the first power-saving mode to the second power-saving mode when the instruction contained in the packet is a request for use of the service being provided by the external device.

8. The network system according to claim 7, wherein:
    when the instruction contained in the packet is a request for use of the server function, the power supply control unit of the image forming device determines whether the request is a request for use of the server function of the image forming device and whether the request is a request for use of the server function of the external device;

when the request is a request for use of the server function of the image forming device, the power supply control unit of the image forming device switches the power supply state from the first power-saving mode to the third power-saving mode; and when the request is a request for use of the server function of the external device, the power supply control unit of the image forming device switches the power supply state from the first power-saving mode to the second power-saving mode.

9. The network system according to claim 8, wherein:

when switching the power supply state from the normal mode to the first power-saving mode, the power supply control unit of the image forming device creates and stores a list of devices having the server function;

when the instruction contained in the packet is a request for use of the server function, the power supply control unit of the image forming device supplies the list to the host device;

the host device causes a user to select a device to use the server function, and notifies the image forming device of a result of the selection; and in accordance with the result of the selection, the power supply control unit of the image forming device determines whether the request is a request for use of the server function of the image forming device and whether the request is a request for use of the server function of the external device.

10. The network system according to claim 7, wherein, when the instruction contained in the packet is none of (i) a request for use of the image formation function, (ii) a request for use of the server function, or (iii) a request for use of the service being provided by the external device, the power supply control unit of the image forming device maintains the first power-saving mode as the power supply state.

11. The network system according to claim 7, wherein:
the image forming device further includes a multi-core CPU; and
the power supply control is performed with a core of the multi-core CPU or by lowering clock frequency of the multi-core CPU.

12. The network system according to claim 7, wherein the external device is one of a cloud server and another image forming device having a server function.

13. A non-transitory recording medium storing a computer readable power supply control program to be executed in an image forming device having at least one image formation function of copying, scanning, and printing, and a server function enabling reading of data from a storage unit and writing of data into the storage unit, the image forming device being connected to at least one external device having a server function via a network, the image forming device including:

a power supply control unit controlling a plurality of power-saving modes having different settings for supplying power to hardware, to make power consumption smaller than power consumption in a normal mode for enabling the image formation function;
wherein the plurality of power-saving modes including a first power-saving mode for enabling a network connection function, a second power-saving mode for enabling a mediation function for mediating processing for the external device, and a third power-saving mode for enabling the server function;

the power supply control program causing the power supply control unit to perform:

a first process of switching a power supply state from the normal mode to the first power-saving mode;

a second process of analyzing a packet received from the network;

a third process of determining whether an instruction contained in the packet is a request for use of the image formation function, whether the instruction contained in the packet is a request for use the server function, and whether the instruction contained in the packet is a request for use of a service being provided by the external device, in accordance with a result of the analysis of the packet; and a fourth process of switching the power supply state from the first power-saving mode to the normal mode when the instruction contained in the packet is a request for use of the image formation function, and switching the power supply state from the first power-saving mode to the second power-saving mode when the instruction contained in the packet is a request for use of the service being provided by the external device.

14. The non-transitory recording medium storing a computer readable power supply control program according to claim 13, wherein:

the third process includes determining whether the request is a request for use of the server function of the image forming device and whether the request is a request for use of the server function of the external device, when the instruction contained in the packet is a request for use of the server function;

the fourth process includes switching the power supply state from the first power-saving mode to the third power-saving mode when the request is a request for use of the server function of the image forming device; and the fourth process includes switching the power supply state from the first power-saving mode to the second power-saving mode when the request is a request for use of the server function of the external device.

15. The non-transitory recording medium storing a computer readable power supply control program according to claim 14, wherein:

the first process includes creating and storing a list of devices having the server function when switching the power supply state from the normal mode to the first power-saving mode; and when the instruction contained in the packet is a request for use of the server function, the third process includes supplying the list to the transmitter of the packet, causing the transmitter to select a device to use the server function, and determining, in accordance with a result of the selection, whether the request is a request for use of the server function of the image forming device and whether the request is a request for use of the server function of the external device.

16. The non-transitory recording medium storing a computer readable power supply control program according to claim 13, wherein the fourth process includes maintaining the first power-saving mode as the power supply state, when the instruction contained in the packet is none of a request for use of the image formation function, a request for use of the server function, and a request for use of the service being provided by the external device.

17. The non-transitory recording medium storing a computer readable power supply control program according to claim 13, wherein:
the image forming device includes a multi-core CPU; and
the power supply control unit is made to perform the second through fourth processes with a core of the multi-core CPU or by lowering clock frequency of the multi-core CPU.

18. The non-transitory recording medium storing a computer readable power supply control program according to claim 13, wherein the external device is one of a cloud server and another image forming device having a server function.

\* \* \* \* \*